US010200539B2

(12) United States Patent
Matsushima

(10) Patent No.: US 10,200,539 B2
(45) Date of Patent: Feb. 5, 2019

(54) RELAYING DEVICE, AUDIO COMMUNICATION SYSTEM, AND RELAYING METHOD

(71) Applicant: ICOM INCORPORATED, Osaka (JP)

(72) Inventor: Hisaaki Matsushima, Osaka (JP)

(73) Assignee: ICOM INCORPORATED, Osaka (JP)

( * ) Notice: Subject to any disclaimer, the term of this patent is extended or adjusted under 35 U.S.C. 154(b) by 48 days.

(21) Appl. No.: 15/033,184

(22) PCT Filed: Oct. 31, 2014

(86) PCT No.: PCT/JP2014/079134
§ 371 (c)(1),
(2) Date: Apr. 29, 2016

(87) PCT Pub. No.: WO2015/068665
PCT Pub. Date: May 14, 2015

(65) Prior Publication Data
US 2016/0255202 A1 Sep. 1, 2016

(30) Foreign Application Priority Data

Nov. 7, 2013 (JP) ................................ 2013-231599

(51) Int. Cl.
*H04M 3/56* (2006.01)
*H04W 4/10* (2009.01)
(Continued)

(52) U.S. Cl.
CPC .............. *H04M 3/568* (2013.01); *H04B 7/15* (2013.01); *H04M 3/56* (2013.01); *H04W 4/10* (2013.01);
(Continued)

(58) Field of Classification Search
CPC ............ H04W 4/10; H04M 3/56; H04B 7/15
See application file for complete search history.

(56) References Cited

U.S. PATENT DOCUMENTS

2004/0181584 A1 9/2004 Rosen et al.
2006/0040689 A1* 2/2006 Yoon ....................... H04W 4/10
455/518
(Continued)

FOREIGN PATENT DOCUMENTS

CN 101385309 A 3/2009
CN 102204284 A 9/2011
(Continued)

OTHER PUBLICATIONS

Open Mobile Alliance Ltd., OMA PoC System Description Open Approved Version 2.1—Aug. 2, 2011, Open Mobile Alliance OMA-TS-PoC_System_Description-V2_1-20110802-A, (Aug. 2, 2011), URL: http://www.openmobilealliance.org/release/PoC/V2_1-20110802-A/OMA-TS-PoC_System_Description-V2_1-20110802-A.pdf, p. 1-421, retrieved on Sep. 12, 2017.
(Continued)

*Primary Examiner* — Kamran Afshar
*Assistant Examiner* — Farideh Madani
(74) *Attorney, Agent, or Firm* — Muncy, Geissler, Olds & Lowe, P.C.

(57) ABSTRACT

[Problem] To provide am audio communication system configured such that a relaying device and terminal devices are connected via a communication network, and communication between terminal devices is managed on the relying device side on the basis of the priority of communications. [Solution] The relaying device is provided with a network communication unit, a control unit, and a priority information storage unit. A network communication unit communicates with a plurality of terminal devices via a communication network. A control unit transfers audio signals between terminal devices participating in a communication session. When a calling audio signal specifying a terminal device participating in the existing communication session as a
(Continued)

communication partner is received, and the priority of the new communication session is higher than the existing communication session, the control unit causes the terminal device participating in the existing communication session to participate in the new communication session. The terminal devices transmit, to the relaying device, the audio signals to which transferring destination information indicating the transferring information of the audio signal has been applied.

12 Claims, 10 Drawing Sheets

(51) Int. Cl.
   *H04B 7/15* (2006.01)
   *H04L 29/06* (2006.01)
(52) U.S. Cl.
   CPC ........ *H04L 65/403* (2013.01); *H04L 65/4015* (2013.01)

(56) References Cited

U.S. PATENT DOCUMENTS

| | | | |
|---|---|---|---|
| 2007/0197248 A1 | 8/2007 | Reich et al. | |
| 2007/0281676 A1* | 12/2007 | Borras | H04M 1/2745 455/418 |
| 2009/0132822 A1* | 5/2009 | Chen | H04L 63/0428 713/171 |
| 2009/0161627 A1* | 6/2009 | Ekambaram | H04W 72/1215 370/331 |
| 2009/0323581 A1* | 12/2009 | Masuda | H04M 3/20 370/315 |
| 2011/0189945 A1* | 8/2011 | Fukuzawa | H04W 48/20 455/7 |
| 2014/0146740 A1* | 5/2014 | Yannashina | H04L 45/308 370/315 |

FOREIGN PATENT DOCUMENTS

| | | |
|---|---|---|
| CN | 102379132 A | 3/2012 |
| JP | H05175878 A | 7/1993 |
| JP | 2006-520579 A | 9/2006 |
| JP | 2007-134829 A | 5/2007 |
| JP | 3146714 U | 11/2008 |
| JP | 2009-527945 A | 7/2009 |
| JP | 2010-109506 A | 5/2010 |
| JP | 2013012793 A | 1/2013 |

OTHER PUBLICATIONS

Supplemental European Search Report for corresponding EP application No. 14859471 dated May 26, 2017.
ETSI, Digital cellular telecommunications system (Phase 2+); Voice Group Call Service (VGCS); Stage 2, (Dec. 12, 2012), pp. 1-197, URL: http://www.etsi.org/deliver/etsi_ts/143000_143099/143068/11.04.00_60/ts_143068v110400p.pdf, retrieved on Aug. 21, 2017.
International Search Report of PCT/JP2014/079134.

* cited by examiner

| DESTINATION IP ADDRESS | SENDER IP ADDRESS | PAYLOAD | | |
|---|---|---|---|---|
| | | AUDIO SIGNAL | PARTNER IDENTIFICATION NUMBER (SESSION NUMBER) | SOURCE TERMINAL NUMBER |

TERMINAL TABLE

| TERMINAL NUMBER | ACTIVE FLAG | CONFIGURATION DATA STORAGE ADDRESS |
|---|---|---|
| 1 | ○ | 001 |
| 2 | ○ | 002 |
| ⋮ | ⋮ | ⋮ |
| 100 | × | 100 |

GROUP TABLE

| GROUP NUMBER | BELONGING TERMINAL |
|---|---|
| G1 | 1,2,3,4,5 |
| G2 | 6,7,8,9,10 |
| ⋮ | ⋮ |
| G20 | 96,97,98,99,100 |

MIXING TABLE

| SESSION NUMBER | CALLING TERMINAL | EXTRA TERMINAL | EXCLUDED TERMINAL | PARTICIPATING TERMINAL | HOLDING TIME (TS) |
|---|---|---|---|---|---|
| G1 | 23 | 23 | 2 | 1,3,4,5,23 | 1500 |
| 19 | 2 | — | — | 2,19 | 1500 |

PRIORITY TABLE

| COMMUNICATION FORM (KIND OF CALLING) | BELONGING TERMINAL |
|---|---|
| PLENARY COMMUNICATION | 1(HIGH) |
| INDIVIDUAL COMMUNICATION | 2 |
| GROUP COMMUNICATION | 3(LOW) |

MIXING TABLE

| SESSION NUMBER | CALLING TERMINAL | EXTRA TERMINAL | EXCLUDED TERMINAL | PARTICIPATING TERMINAL | HOLDING TIME (TS) |
|---|---|---|---|---|---|
| 6 | 1 | - | - | 1,6 | 1500 |

FIG.6D

MIXING TABLE

| SESSION NUMBER | CALLING TERMINAL | EXTRA TERMINAL | EXCLUDED TERMINAL | PARTICIPATING TERMINAL | HOLDING TIME (TS) |
|---|---|---|---|---|---|
| 6 | 1 | - | - | 1,6 | 1500 |
| G1 | 5 | - | 1 | 2,3,4,5 | 1500 |

FIG.6E

RELAYING DEVICE, AUDIO COMMUNICATION SYSTEM, AND RELAYING METHOD

BACKGROUND OF THE INVENTION

Technical Field

The present invention relates to an audio communication system using a network such as a wireless LAN.

Background Art

It has been mainly used as a device performing audio communication via radio waves that a so-called radio transceiver which modulates a high frequency carrier at a continuous time signal in an analog signal or a digital signal and transmits the modulated carrier. Although the radio transceiver performs one-on-one communication in general, it has also been proposed the radio transceiver with a group communication function that communicates between more than three radio transceivers at the same time.

Furthermore, as disclosed in Japanese Unexamined Patent Publication No. 2010-109506, a radio communication system (a radio trunking system) including a server, a repeater, the radio transceiver, and the like is also provided. The system comprises a priority call function for calling and communicating to even a busy transceiver if a higher priority call request is generated. In the system, the radio transceiver determines the priority of the call request and switched a communication partner. Specifically, the communication partner is switched by changing the relaying device channel in response to the higher priority call request.

PRIOR ART REFERENCE

Patent Literature

Patent Literature 1: Japanese Unexamined Patent Publication No. 2010-109506

BRIEF SUMMARY OF THE INVENTION

In the trunking system described above, it takes time to complete switching communication because it needs to change the relaying device channel when the higher priority call request is generated. Moreover, it has radio wave inefficiency in the system because a plurality of the relaying device channels (radio waves) are needed for providing the priority call function, and when all the relaying device channels are used, it is hard to switch the communication partner.

The purpose of the present invention is to provide an audio communication system and a relaying device therefor which enables a user to switch to the higher priority communication in the relaying device collectively by connecting the relaying device with the terminal device as the communication device via a communication network and manage the communication between the terminal devices in the relaying device on the basis of belonging of the terminal device.

A relaying device of the present invention comprises a network communication unit communicating with a plurality of terminal devices via the communication network, a control unit, and a priority information storage unit. The control unit establishes a communication session when a calling audio signal is received from the first terminal device, wherein the communication session is participated by the first terminal device and a terminal device of a communication partner designated by the calling audio signal, and transferring the audio signal mutually between the terminal devices participating in the communication session. The priority information storage unit stores priority information of the communication session. Furthermore, the control unit includes a priority determining unit for determining the priority of the existing communication session and a new communication session which should be established by the calling audio signal on the basis of the priority information on receiving the calling audio signal designating the terminal device participating in the existing communication session as the communication partner, and makes the terminal device participating in the existing communication session resign from the existing communication session and participate in the new communication session in the case the priority of the new communication session is higher than that of the existing communication session.

A program of the present invention drives a computer of the terminal device having a network communication unit communicating with a plurality of the terminal devices via a network and a storage unit storing the priority information of the communication session by a plurality of the terminal devices to function as a first means for establishing a communication session when a calling audio signal is received from the first terminal device, wherein the communication session is participated by the first terminal device and a terminal device of a communication partner designated by the calling audio signal, and transferring the audio signal mutually between the terminal devices participating in the communication session. The first means comprises a second means for determining the priority of the existing communication session and a new communication session which should be established by the calling audio signal on the basis of the priority information on receiving the calling audio signal designating the terminal device participating in the existing communication session as the communication partner, and a third means for making the terminal device participating in the existing communication session resign from the existing communication session and participate in the new communication session in the case the priority of the new communication session is higher than that of the existing communication session.

In a relaying method of the present invention, the control unit of the terminal device which comprises a network communication unit communicating with a plurality of terminal devices via the communication network and a storage unit storing the priority information of the communication session by a plurality of the terminal devices performing a first procedure for establishing a communication session when a calling audio signal is received from the first terminal device, wherein the communication session is participated by the first terminal device and a terminal device of a communication partner designated by the calling audio signal, transferring the audio signal mutually between the terminal devices participating in the communication session. The first procedure comprises a second procedure for determining the priority of the existing communication session and a new communication session which should be established by the calling audio signal on the basis of the priority information on receiving the calling audio signal designating the terminal device participating in the existing communication session as the communication partner, and a third procedure for making the terminal device participating in the existing communication session resign from the existing communication session and participate in the new communication session in the case the priority of the new communication session is higher than that of the existing communication session.

The control unit, the first means, or the first procedure may establish an individual communication session in which one terminal device and one partner terminal device participate, a group communication session in which the terminal device belonging to the prepared group participates, and a plenary communication session in which all the communicable terminal devices participate. The priority information storage unit may store the priority information of each communication session.

The control unit, the first means, or the first procedure may close the communication session when a predetermined time elapses without receiving the audio signal from any of the participating terminal devices.

When the new communication session is closed and the existing communication session is not closed yet, the control unit, the first means, or the first procedure may make the terminal device removed from the existing communication session participate in the existing communication session again.

An audio communication system of the present invention has a relaying device and a plurality of terminal devices communicating mutually via a communication network. The terminal device comprises a network communication unit for being connected with a communication network and communicating with a plurality of terminal devices via the communication network and a terminal control unit transmitting the audio signal to which the information designating the terminal device of the communication partner is attached to the relaying device using the terminal network communication unit.

The terminal device further comprises a push-to-talk circuit, and the terminal network communication unit may transmit the audio signal to the relaying device while the push-to-talk circuit is in ON status and receive the audio signal transmitted from the relaying device regardless of that the push-to-talk circuit is in ON/OFF status.

The network comprises a plurality of the access points for the wireless local area network, and the terminal network communication unit of the terminal device may connect to the network via any one of the access points.

According to the present invention, it will be able to switch immediately to the higher priority communication in a relaying device collectively by connecting the relaying device to a terminal device as a communication device via a communication network, and managing the priority of the communication and the communication between the terminal devices in the relaying device.

BRIEF DESCRIPTION OF DRAWINGS

FIG. 6D shows a mixing table which is provided in the server.

FIG. 6E shows a mixing table which is provided in the server.

DETAILED DESCRIPTION OF THE EMBODIMENT

Figure 1:
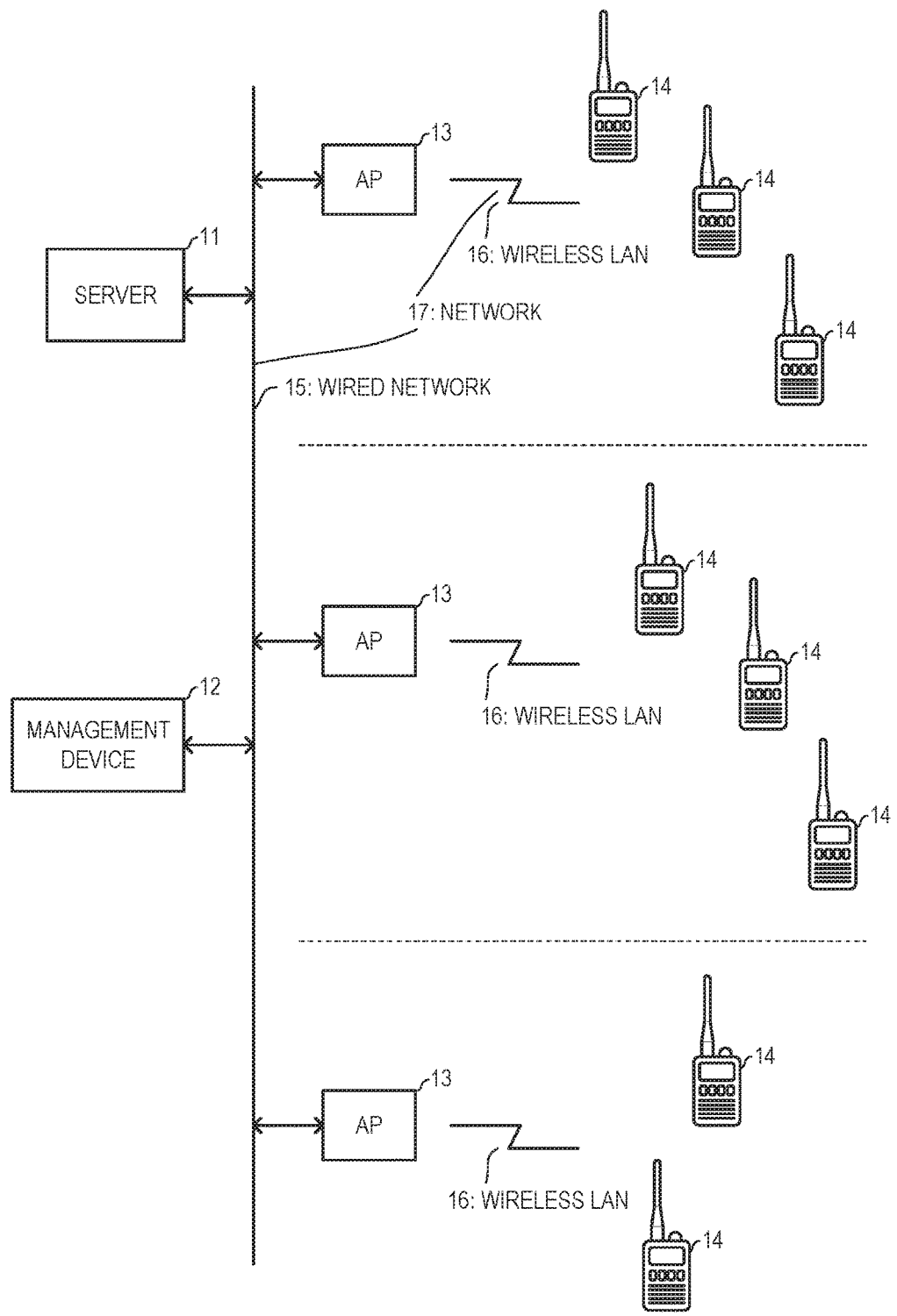
FIG. 1 shows a configuration of an audio communication system according to the embodiment of the present invention.
Figures 2, 3:
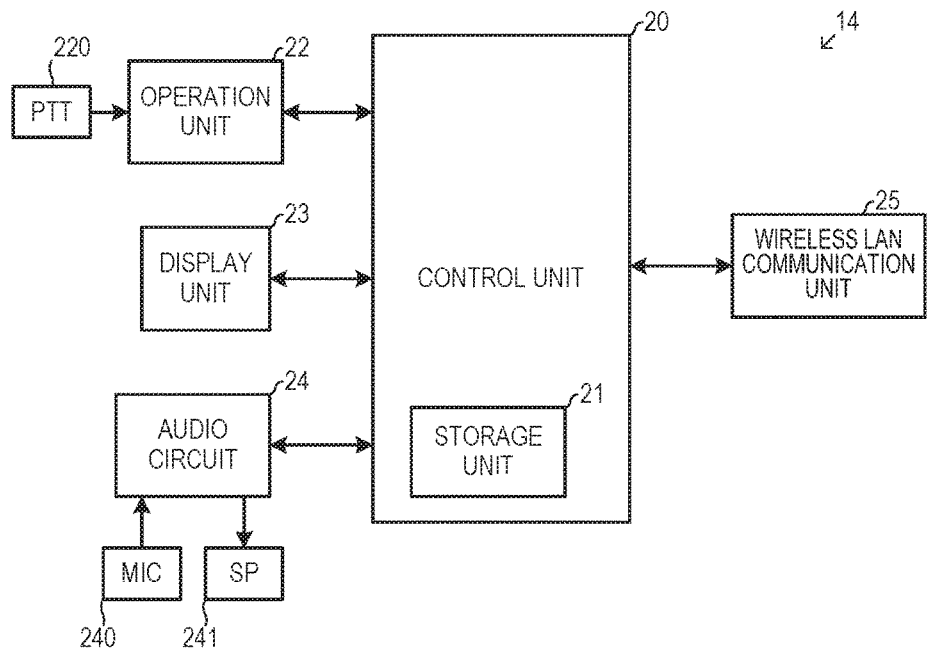
FIG. 2 is a block diagram of a transceiver which is a terminal device.
FIG. 3 shows an example of a constitution of a voice packet.

Referring to the figures, an audio communication system, which is the embodiment of the present invention, will be explained. FIG. 1 shows a configuration of a communication system according to the embodiment of the present invention. In the audio communication system, a plurality of terminal devices 14 communicate mutually, using a wireless LAN 16 such as Wi-Fi. The shape of the terminal device 14 is similar to a handy transceiver for radio communication, which has a push-to-talk (Push to Talk: PTT) switch 220 as shown in FIG. 2. In terms of functions, the terminal device 14 is a wireless network device which transmits and receives the voice packet via a wireless access point (AP) 13. The server 11, which is the relaying device, relays the mutual communication of a plurality of the terminal devices 14 via a wired network 15 or a wireless Local Area Network (LAN) 16. Hereinafter, the wired network 15 and the wireless LAN 16 are collectively referred to as a network 17.

The terminal device 14 can perform individual communication, group communication, plenary communication (a plenary call) via the server 11. In the individual communication, one-on-one communication designating a communication partner (another terminal device 14) is performed. In the group communication, communication with the terminal devices 14 which belongs to the prepared group is performed. In the plenary communication, communication with all communicable terminal devices 14 connected to the network 17 is performed. A user selects his or her desired communication form from them by operating his or her own terminal device 14. The server 11 establishes any one of the above communication sessions in response to the call from the terminal device 14. Priority is provided to each form of communication sessions. In case that a communication session of higher priority which contains its own device is established, if a terminal device 14 is participating in a communication session, the participating communication session is switched to the higher priority communication session. Details will be described thereafter.

The terminal device 14 is connected to the network 17 on start-up. The server 11 transmits the configuration data to the terminal device 14, and sets up the terminal device 14 for a communicable state, when the terminal device 14 is connected to the network 17. The configuration data transmitted from the server 11 contains, for example, a group number to which the terminal device 14 can connect or an updating program.

Ethernet (registered trademark) LAN, the Internet and the like can be used as the wired network 15. Secure communication is available by using Virtual Private Network (VPN) when the wired network 15 includes the Internet. A communication system based on IEEE802.11 such as Wi-Fi can be applied as the wireless LAN 16. The terminal device 14 communicates with the wireless access point 13 via the communication system of the wireless LAN 16.

A plurality of the wireless access points 13 are installed. Each wireless access point 13 is installed respectively, for example, on a different floor or in a different room of a building. Thus, it is possible to estimate the floor or the room where the terminal device stays, depending on which communication areas of the wireless access points 13 the terminal device is belonging to.

A management device 12 is connected to the wired network 15. The management device 12 consists of a personal computer in which a management program is installed or the like, which accesses to the server 11 in response to the operation by the administrator and sets the tables shown in FIGS. 5A, 5B in the server 11. The management device 12 also functions as a terminal device, and it is possible to communicate with another terminal device 14.

FIG. 2 is a block diagram of the terminal device 14. As mentioned above, in terms of functions, the terminal device 14 is a wireless network device which transmits and receives a voice packet via the wireless access point (AP) 13 of the wireless LAN. A control unit 20 controls an operation of the terminal device 14, which consists of a microprocessor. The control unit 20 has a storage unit 21 in which various data is stored. The configuration data which is downloaded from the server 11 is stored in the storage unit 21. An operation unit 22, a display unit 23, an audio circuit 24 and a wireless LAN communication unit 25 are connected to the control unit 20. The operation unit 22 includes key switches such as the PTT switch 220 receiving the user's operation, and inputs the operation signal to the control unit 20. The display unit 23 includes a liquid-crystal display, which shows an identification number of the communication partner whom the user's operation selects, the identification number of the called communication partner and the like.

The audio circuit 24 has a microphone 240 and a speaker 241. The control unit 20 decodes the received voice packet and inputs it into the audio circuit 24. The audio circuit 24 converts the decoded audio signal to the analog signal and outputs it through the speaker 241. The audio circuit 24 also converts the audio signal input by the microphone 240 to the digital signal and inputs it into the control unit 20. The control unit 20 packetizes the digital audio signal to the voice packet and inputs it into the wireless LAN communication 25. The wireless LAN communication unit 25 has a circuit for conducting wireless communication in the communication method conforming to the IEEE802.11. The wireless LAN communication unit 25 transmits the packet input from the control unit 20 to the wireless access point 13 and inputs the received packets from the wireless access point 13 into the control unit 20.

When the user speaks to the microphone 240 with pressing the PTT switch 220, the terminal device 14 converts the audio signal to the voice packet and transmits it to the server 11. The voice packet has a constitution as shown in FIG. 3. A header of the voice packet includes a destination address and a sender address. A payload includes a transferred terminal number and a source terminal number along with the digitalized audio signal. The transferred terminal number is the identifying number of the communication partner (a target device). The identifying number of the communication partner is the terminal number (in the individual communication), the group number (in the group communication), or a plenary number (in the plenary communication). The final destination of the audio signal is the terminal device of the communication partner, although the address of the voice packet transmitted from the terminal device 14 is the server 11. The server 11 takes out the payload from the voice packet and transfers the audio signal (the voice packet) to the terminal device 14 of the communication partner, when the voice packet is received. In case that the identifying number of the communication partner is the group number or the plenary number, the audio signal is transferred to a plurality of the terminal devices 14 as the communication partner, that is, in the case of the group communication, the audio signal is transferred to a plurality of the terminal devices 14 belonging to the group. Moreover, in the case of the plenary communication (the plenary number), the audio signal is transferred to all the communicable terminal devices 14.

So as to transfer the audio signal, a new voice packet which contains the IP address of the transferred terminal device 14 as the destination address and the IP address of the server 11 as the sender address is generated. The transferred terminal number included in the payload of the new packet is same as the voice packet which the server 11 received. The source terminal number may be cleared, or the same of the voice packet which the server 11 received may be attached.

To summarize the above process, the terminal device 14 transmits the voice packet containing the audio signal input from the microphone 240 and the attached partner ID number without a procedure for establishing communication such as a SIP procedure when the PTT switch 220 is turned on. The server 11 transfers the audio signal to the communication partner identified by the partner ID number. Thus, the audio communication system of the embodiment allows the user to start communication almost at the same time of turning on the PTT switch 220, and to perform communication with a sense of use like using the conventional radio communication transceiver due to starting the communication by transmitting the voice packet (RTP packet). For the sense of use, the server 11 manages the IP address, the group and the like of each terminal device 14, and transfers the audio signal.

The terminal device 14 has a VOX circuit as well as the PTT switch 220. The VOX circuit is the circuit that determines whether a talking voice (the audio signal) is input on the basis of the input level of the microphone 240 and the duration time, and makes the terminal device switch to the transmission state (PTT switch is turned on), when it is determined that the talking voice is input. The terminal device 14 may switch transmitting on/off using the VOX circuit, instead of the PTT switch 220 or with PTT switch 220. A general radio communication transceiver has a simplex system which cannot receive a radio signal during transmitting. On the other hand, the terminal device 14 can transmit and receive the voice packet simultaneously because the audio signal is transmitted and received by the voice packet communication via the wireless LAN 16. The terminal device 14 can communicate by a full-duplex method which transmits and receives the audio signal simultaneously. Not to keep transmitting a silent voice packet, even when it performs the full-duplex communication, the terminal device 14 edits and transmits the voice packet by the PTT switch 220 or the VOX function only in case that the talking voice is input.

The server 11 transfers the audio signal contained in the voice packet received from the terminal device 14 via the network 17, to the terminal device 14 of the communication partner via the network 17. In the group communication, the audio signal is transferred to a plurality of the terminal devices 14 which belong to the group. In the group communication or the plenary communication, it may occur that a plurality of the users speak at the same time and the audio signals are transmitted from a plurality of the terminal devices 14 to the server 11 simultaneously. In this case, the server 11 edits a new audio signal mixing the received audio signals, makes the voice packet containing the mixed new audio signal, and transfers it to each of the terminal devices 14. In this case, the server 11 mixes individually for each terminal device 14 belonging the group, and the audio signal transmitted by the device itself is not made to be included and returned in the mixed audio signal for each terminal device 14. That is, the audio signal mixed all received audio signals are transferred to the terminal device 14 which does not transmit the audio signal, and the audio signal mixed the received audio signals other than that transmitted by the terminal device 14 is transferred to the terminal device 14 transmitted the audio signal. Thus, echoes of the self-transmitted audio signal are canceled in the terminal device 14.

Figures 4, 5A:
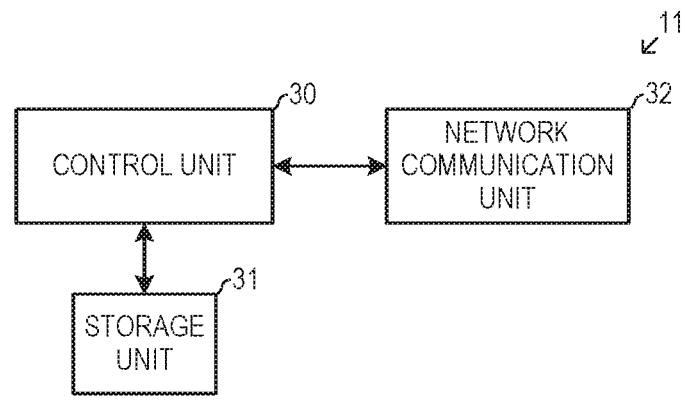
FIG. 4 is a block diagram of a server.
FIG. 5A shows a terminal table which is provided in the server.

FIG. 4 is a block diagram of the server 11, which has a control unit 30, a storage unit 31 and a network communication unit 32. The storage unit 31, for example, consists of a hard disc, RAM and the like, and stores tables shown in FIG. 5, the configuration data of each terminal device and the like. The control unit 30 performs setting up the terminal device 14, mixing the audio signal and the like. The network communication unit 32 controls the communication with the wired network 15.

FIGS. 5A, 5B, 5C and 5D are diagrams showing tables provided in the storage unit 31 of the server 11.

FIG. 5A is a diagram showing a terminal table 301, which is a table for the server 11 managing the terminal device 14. Any of the terminal device 14 is identified by an identification number (a terminal number) which is assigned respectively so as to be unique. An active flag and a storage address of the configuration data for every terminal number are stored in the terminal table 301. The active flag indicates that the terminal device 14 is connected to the network 17, is registered by the server 11 and has downloaded various data by accessing the server 11, that is, it is possible to perform radio communication by completing the registration. The active flag is set when the server 11 completes the registration of the terminal device 14. The configuration data is, for example, the updating data of the program (a firmware), its own group, an address book storing another group which is permitted to communicate and the like.

The server 11 performs the registration of the terminal device 14 communicating with it, when the terminal device 14 is connected to the network 17. Moreover, the server 11 updates the registration of the terminal device 14 communicating with the terminal device 14 at the appropriate timing thereafter. The appropriate timing thereafter means, for example, at regular time intervals or when the connected wireless access point 13 is switched.

The user operates the terminal device 14 and makes a candidate number of the communication partner display on a display unit 23, when the user selects the communication partner. The candidate number of the communication partner means the terminal number of the active terminal device 14 described above and the group number whose communication is permitted.

Figure 5B:
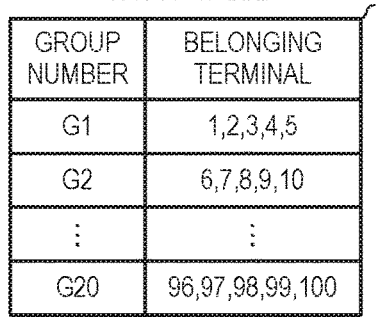
FIG. 5B shows a group table which is provided in the server.

FIG. 5B shows a group table 302, which is the table for the server 11 to manage the group. Each group is identified by the identified number (the group number) which is assigned respectively so as to be unique. The group number and the terminal number of the terminal device 14 (a belonging terminal device) which belongs to the group are stored in the group table 302 for every group number. The terminal device 14 which belongs to the group may be one or more. A terminal table 301 and the group table 302 are provided in the server 11 by the management device 12 operated by the administrator.

Figure 5C:
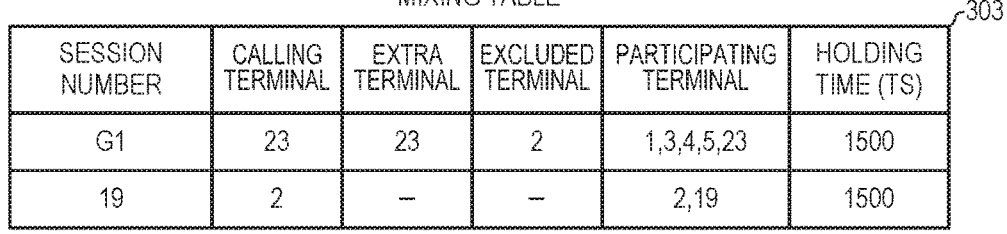
FIG. 5C shows a mixing table which is provided in the server.

FIG. 5C shows a mixing table (a session table) 303, which is the table for the server 11 to manage the communication session. The communication session is a communication state among a plurality of the terminal devices 14 with the server 11 as the relaying device. The mixing table 303 has a plurality of lines, and each line stores one unit of information of a communication session. When the audio signal (the voice packet) is received from the terminal device 14, the server 11 determined which communication session the audio signal is distributed in by referring to the mixing table 303.

The communication session is proceeded, for example, in following procedures. The communication session is established, that is, the mixing table is provided when the first calling voice packet to establish the communication session is received from the terminal device 14. A talking voice (for a few seconds, for example) is divided into a short voice packet (20 milliseconds in the embodiment), then transmitted and received. Furthermore, in the communication session, the talking voice replying to a talking voice is transmitted from another terminal device. An interval between the talking voice and the replying talking voice (silent time) is approximately from 0 to few seconds. The holding time of the communication session is provided to more than the maximum value of the silent time in general communication. The procedure for the basic communication session above is common to all the communication forms of the individual communication, the group communication and the plenary communication, however, the procedure of providing the mixing table 303 is different by each communication form.

For each communication session, items such as a session number, a calling terminal number, a participating terminal number, an extra terminal number, an excluded terminal number and remaining holding time (T1) are provided in the mixing table 303. The session number is the number for identifying the communication session. The calling terminal number is the terminal number of the terminal device 14 (the calling terminal device) for transmitting the first voice packet (a calling voice packet) of the communication session. In the embodiment, the partner ID number contained in the calling voice packet is used for the session number, though any unique value for each communication session may be used. The communication session that the terminal number is registered as the session number (such as "19") is the communication session of the individual communication, which is the one-on-one, individual communication between the terminal devices 14. The communication session that the group number is registered as the session number (such as "G1") is the communication session of the group communication, which is the communication that a plurality of the terminal devices 14 (typically more than 3) exchange the audio signal mutually. Furthermore, the communication session whose plenary number (such as "A", referred to FIG. 6C) is registered as the session number is the communication session of the plenary communication (an plenary communication session), which is the communication for exchanging the audio signals mutually among all the communicable terminal devices connected to the network 17.

The participating terminal number is a list of the terminal number of the terminal device 14 which participates in the communication session. When the voice packet is transmitted from the terminal device 14 whose terminal number is registered in the participating terminal number, the control unit 30 transfers the voice packet to another terminal device 14 whose terminal number is registered in the participating terminal number, therefore executes the mutual communication between the participating terminal devices.

In the case of the group communication session, the participating terminal number is the terminal number of the calling terminal device and the terminal number of the terminal device 14 which belongs to the group designated by the communication partner. However, the terminal device 14 which belongs to the group but is not active or which performs another individual communication session cannot participate in the group session. The terminal number thereof is excluded from the participating terminal number (which is registered in a field of excluded terminal numbers). In case that the calling terminal device does not belong to the group, that is, the terminal device 14 calls a group other than its own belonging group, the terminal number thereof is also registered as the participating terminal number. The terminal number is registered simultaneously in a field of the extra terminal number as the extra terminal number registered temporarily as a member. That is, the calling terminal device is treated as the terminal device 14 participating in the communication session (the participating terminal device) as well as the terminal device belonging to the group, even if it does not belong to the group.

In the case of the plenary communication session, the participating terminal number is the terminal number of the calling terminal device or the terminal number of all the communicable terminal devices 14. The excluded terminal number is same as the group communication. Moreover, the extra terminal number is not registered.

In the case of the individual communication session, the terminal number of the calling terminal device and the terminal device 14 of the communication partner as the participating terminal number are registered. The extra terminal number and the excluded terminal number is not registered because of one-on-one communication.

In this case, the fields of the extra terminal number and the excluded terminal number in items of the mixing table 303 are not essential. It is possible to manage the table only by adding the terminal number into the field of the participating terminal number, or by excluding it from the field of the participating terminal number.

Holding time is the time the communication session is being kept without closing in a condition of no voice packet transmitted from the participating terminal device. The holding time of each communication session in the server 11 is set, for example, to 30 seconds. A holding timer (TS) of the mixing table 303 is the timer which counts a lapse of the holding time, when the voice packet is not transmitted. In the processing by the control unit 30 (referred in FIG. 7), the holding timer TS is counted down if the voice packet is not transmitted, and is reset to 30 seconds if the voice packet is transmitted. In the event the timer TS is up because the voice packet is not transmitted from the participating terminal device for 30 seconds, the communication session is closed and information of the communication session is deleted from the mixing table 303.

In the embodiment above, in the group communication session, the calling terminal device is additionally registered in the item of the participating terminal device of the mixing table 303 other than the belonging terminal device, and even if it is the belonging terminal device, the terminal devices 14 which is not active and which performs another communication session are excluded. However, the terminal device 14 additionally registered in the item of the participating terminal device and the excluded terminal device 14 are not limited to these.

When the terminal device 14 participating in the lower priority communication session (such as the group session) starts another communication session whose priority is higher (such as the individual session) in the middle, it is excluded from the participating terminal device of the lower priority communication session. That is, the terminal number of the terminal device 14 is shifted from the field of the participating terminal number to the field of the excluded terminal number.

To continue the communication session, it is also necessary that the holding time is counted in each terminal device 14. The holding time (T1) of the terminal device 14 is shorter than that of the server 11 (TS=30 seconds), for example, 5 seconds is set in the timer T1. The user can start another communication session by predetermined operation from when 5 seconds elapses after turning off the PTT switch 220, even if the communication session is maintained in the server 11.

It may also divide the mixing table 303 into 2 tables, an executing mixing table and a saving table. The executing mixing table is a table for registering the session executing mixing, and generated on a high-speed memory. The session in which the communication (transmitting and receiving the voice packet) stops is transcribed into the saving table in a short time of about 200 milliseconds, and kept only during the holding time (T1) in the saving table. When the communication (transmitting and receiving the voice packet) occurs again during the holding time, the session is transcribe again into the performing mixing table, and used for performing mixing. Thus, it becomes possible to release rapidly each terminal device from the mixing table 303.

Figure 5D:
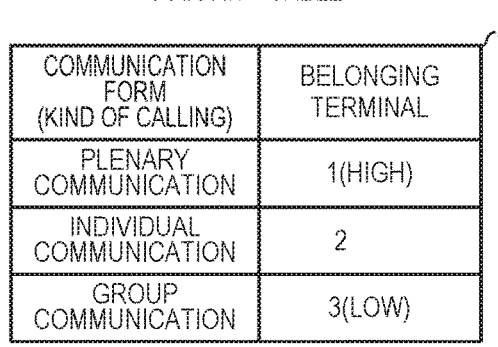
FIG. 5D shows a priority table which is provided in the server.

FIG. 5D shows a priority table 304. In the priority table 304, priority of the communication is stored in response to each communication session form (each kind of call). The priority is, for example, shown as numerical value and the smaller value has the higher priority. The server 11 uses the priority to determine whether or not to make the terminal device 14 move to the new communication session from the existing communication session when establishment of the new communication session including the terminal device 14 is requested. That is, when the priority of the new communication session is higher than that of the existing communication session, the communication session of the terminal device 14 is made to move to the new communication session of higher priority. In this case, the priority table is provided by the administrator operating the management device 12. It will be explained using an example of the mixing table 303 shown in FIGS. 6A, 6B and 6C later in the followings.

Figure 6A:
FIG. 6A shows a mixing table which is provided in the server.
Figure 6B:
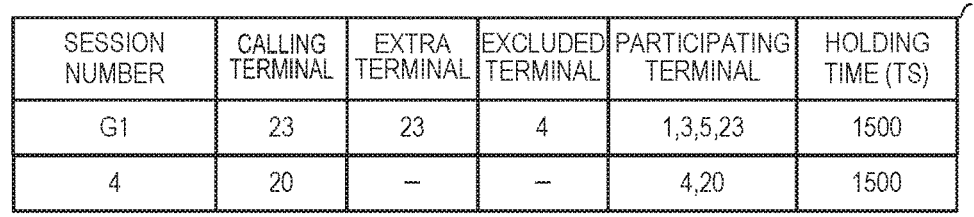
FIG. 6B shows a mixing table which is provided in the server.

For example, it will be explained that the group communication session of the session number "G1" (the group communication session "G1") has already been registered as shown in FIG. 6A and the terminal device 14 of the terminal number "20" transmits the request (the calling voice packet) of the individual communication session with the terminal device 14 of the terminal number "4" to the server 11. The terminal device 14 of the terminal number "4" is participating in the group communication session as shown in FIG. 6A. The server 11 compares the third priority of the existing group communication session and the second priority of the new individual communication session to the terminal device 14 of the terminal number "4" referring to the priority table 304. The server 11 determines that the new communication session (the individual communication session) has the higher priority by the comparison, and switches the communication session of the terminal device 14 of the terminal number "4" from the group communication session to the individual communication session. Thus, as shown in FIG. 6B, a new communication session having the terminal number "4" as the session number is registered to the mixing table 303, and in the group communication session "G1", the terminal number "4" registered in the item of the participating terminal is made to move to the item of the excluded terminal.

In the above group session, a plurality of the terminal devices 14 are registered as the participating terminal if the terminal device of terminal number "4" is excluded. Thus, the registration of the above group communication session in the mixing table 303 is maintained. However, it may be possible to deregister the session (to close the communication session).

Figure 6C:
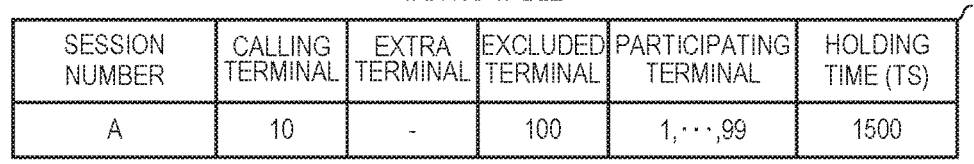
FIG. 6C shows a mixing table which is provided in the server.

Next, for example, it will be explained that the group communication session "G1" has already been registered as shown in FIG. 6A and the terminal device 14 of the terminal number "10" transmits the request (the calling voice packet) of the plenary communication session to the server 11. As all the communicable terminal devices 14 are subject to the plenary communication session, all the participating terminals of the group communication session "G1", which are the terminal communicable devices 14 also are subject to the plenary communication session. Thus, the server 11 compares the priority of the existing group communication session "third" to the priority of the new plenary communication session "first" referring to the priority table for the terminal device 14 of the terminal number "1", "2", "3", "4", "5", and "23". The server 11 determines that the priority of the plenary session is higher, and transfers of the above terminal devices 14 to the plenary communication session from the group communication session. That is, as shown in FIG. 6C, a new communication session having the session number of the terminal number "A (a plenary number)" is registered to the mixing table 303. As all the participating terminals are transferred to the plenary communication session, the group communication session "G1" is deregistered (the group communication session is closed). Furthermore, a non-active terminal device 14 (the active flag: OFF) of the terminal number 100, which is unable to communicate is registered to the excluded terminal.

Moreover, it will be explained that the individual communication session (the session group) of the session number "6" shown in FIG. 6D has already been registered and the terminal device 14 of the terminal number "5" transmits the request (the calling voice packet) of the group communication session of the group number "G1" to the server 11. The terminal device 14 of the terminal number "1" included in the group "G1" is participating in the individual communication session as shown in FIG. 6. Thus, the server 11 compares the second priority of the existing individual communication session and the third priority of the new group communication session to the terminal device 14 of the terminal number "1" referring to the priority table. The server 11 determines that the individual communication session has the higher priority, and keeps the existing individual communication session of the terminal device 14 of the terminal number "1". As the terminal device 14 which is another communication partner of the group communication session (the terminal number "2", "3", and "4") can communicate (not in another communication session), the group communication session is possible. Thus, as shown in FIG. 6E, a new communication session of the session number "G1" in which the terminal number "1" is the excluded terminal is registered.

In this case, the new communication cannot be switched in case that the priority of the existing communication session and of the new communication session is same. It can be switched only in the case of the higher priority, however, it may also be possible to switch to the new communication session in the case of the same priority. The priority of the priority table 304 is not limited to this and the individual communication session may be made to be the priority 1.

Figure 7:
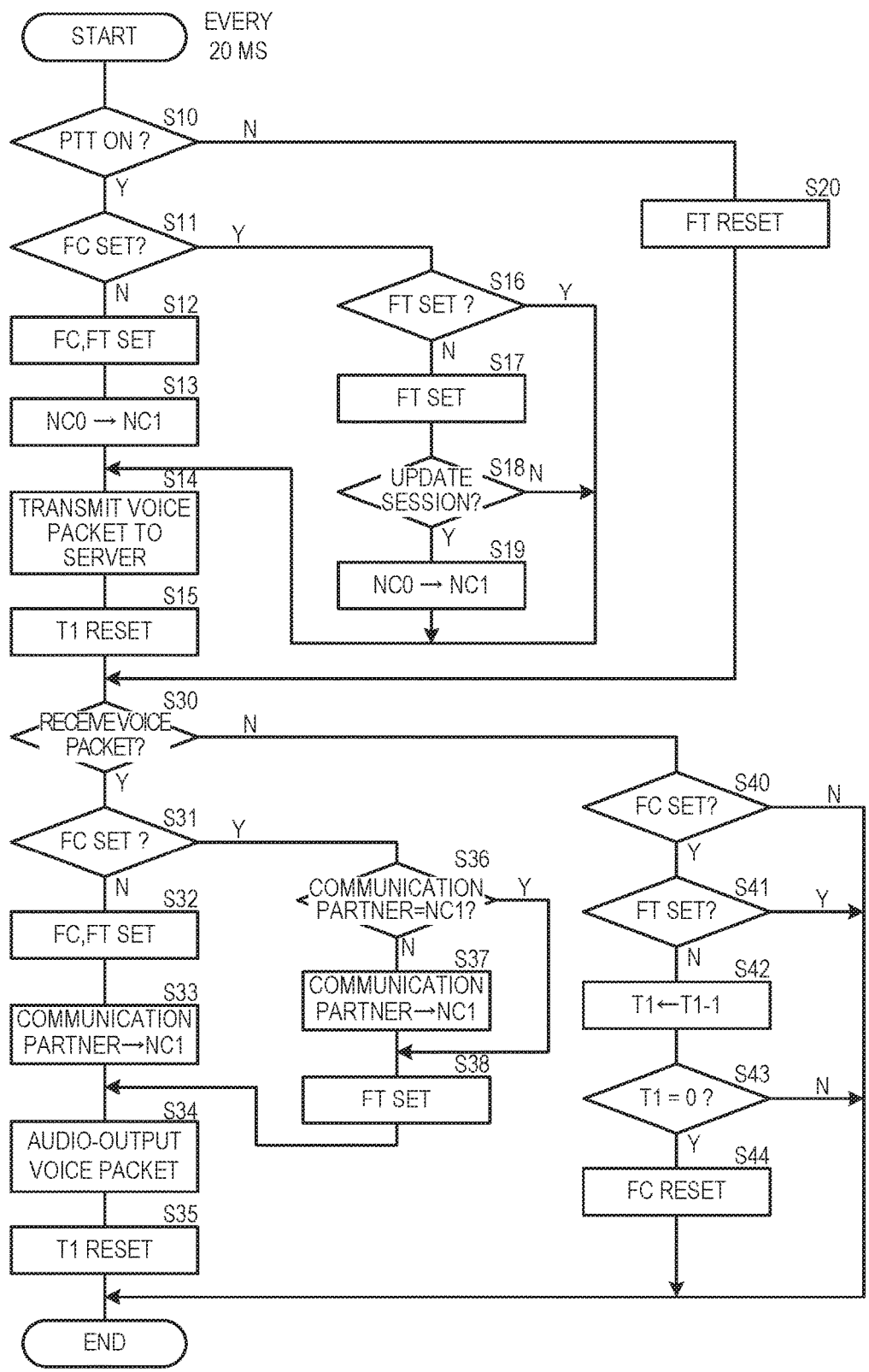
FIG. 7 is a process flowchart of a transceiver.

FIG. 7 is a flowchart showing communication control processing performed by the control unit 20 of the terminal device 14. The processing is performed repeatedly every 20 milliseconds. Existing communication state (status) is determined in response to turning on/off of the PTT switch 22 or receiving the voice packet (RTP packet). The kinds of flags or timers used in the flow chart are as follows.

PTT: It is the abbreviation of the Push-To-Talk switch (PTT switch) 220, which is not limited that the PTT switch 220 is turned on/off. It is also included that the transmission signal by the VOX circuit is on/off.

NC0: The identification number (the individual number/the group number/the plenary number) of the communication partner selected by the operation of the user.

NC1: The session number, the identification number which identifies the performing communication session, and the identification number (the individual number/the group number/the plenary number) of the communication partner which is contained in the first voice packet establishing the communication session are used.

FC: A communication session flag (the flag showing that the terminal device 14 participates in the communication session)

FT: A communicating flag (the flag showing that the voice packet is being transmitted or being received)

T1: A holding timer (the timer counting the holding time (5 seconds) of the communication session)

S10-S20 are management processing for transmitting the voice packet. The control unit 20 determines the state of the PTT switch 220 (S10), which proceeds the processing to S11 in case that PTT switch 220 is being turned on, and proceeds the processing to S20 in case that the PTT switch is being turned off. In the description of the flowchart, turning on the PTT switch comprises turning on the transmitting function by VOX.

In S11, the control unit 20 determines whether the communication session flag FC is set or not. When the communication session flag FC is not set (No in S11), the voice packet which is generated by the PTT switch 220 being turned on this time is the calling voice packet. The control unit 20 sets the communicating flag FT showing that the communication session flag FC and the voice packet is being transmitted and received (S12). The control unit 20 transcribes the communication partner number NC0 selected by the user into the communication session number NC1 (S13), and transmits the voice packet containing the communication session number NC1 with the audio signal in the payload to the server 11 (S14). By transmission of the calling voice packet, the communication session is started by the server 11. The control unit 20 proceeds management processing for receiving the voice packet after resetting the holding timer T1 to 5 seconds (S15).

In case that the communication session flag FC has already been set in S11 (Yes in S11), the control unit 20 determines whether the communicating flag FT is set or not, that is, the voice packet is being transmitted or received (S16). When the communicating flag FT is not set (No in S16), the control unit 20 sets the communicating flag FT (S17). In case that a new voice packet (talking voice of the user) is started transmitting with the state in which the communication session already started is maintained, the processing is proceeded from S11 to S16, and then to S17. In S18, the control unit 20 determines whether to maintain the now existing communication session and reply the voice packet to the now existing communication session (No in S18), or to establish another new communication session leaving from the existing communication session and transmit the voice packet to the new communication partner (Yes in S18). It meant that the control unit 20 determines whether to reply to the existing communication session with the voice packet (No in S18), or to send the voice packet to a new communication partner of the new communication session (Yes in S18). It may be determined, for example, according to whether the operation by the user just before turning on the PTT switch 220 this time, such as the selection of the communication partner, is performed or not. When the user selects a new communication partner, a new communication session to the selected communication partner may be established in the processing of S19.

When the communication session is switched based on the priority, the user may be able to return the communication session to the previous one just before switching. For example, it may be allowed to operate re-communication from the operation unit 22 of the terminal device 14 and the return processing to the previous communication session may be proceeded with the user operation of the re-communication. In this case, the terminal device 14 detects that the re-communication operation is performed and determines that the communication session is to be updated (YES in S18). The terminal device 14 detects that the re-communication operation is performed, attaches the requesting signal for returning to the previous session to the server 11, and transfers it. The server 11 received the voice packet may also be made to proceed the processing for returning to the previous session.

In case of updating the communication session (Yes in S18), the control unit 20 transcribes the communication partner number NC0 selected then into the communication session number (S19) and proceeds the processing to S14. In case of continuing the communication session already started (No in S18), the control unit 20 proceeds the processing from S18 to S14 directly.

When the PTT switch 220 is not turned on in S10 (No in S10), the control unit 20 resets the communicating flag FT (S20). In addition, in case that the communicating flag FT has already been reset, it is kept as it is. Thereafter, the control unit 20 proceeds the management processing for receiving the voice packet in S30 or below.

The control unit 20 determines whether the voice packet is received via the network 17 or not in S30, which proceeds the processing to S31, when the voice packet is received, and proceeds the processing to S40, when the voice packet is not received.

In S31, the control unit 20 determines whether the communication session flag FC is set or not. When the communication flag FC is not set (No in S31), the communication session flag FC and the communicating flag FT are set (S32) with determining that a new communication session is established and its first voice packet is transmitted this time. A FT flag is the flag showing that the voice packet is being transmitted and received. The control unit 20 transcribes the communication partner number which is included in the voice packet into the communication session number NC1 (S33), outputs the voice packet to the audio circuit 24 (S34), and resets the holding timer T1 to 5 seconds (S35).

In case that the communication session flag FC has already been set in S31 (Yes in S31), the control unit 20 determines whether the session number contained in the transmitted voice packet is the same as the that of the stored in the NC1 or not (S36). When they are the same (Yes in S36), the control unit 20 set the communicating flag FT in response to receiving the transmitted voice packet (S38). In addition, in case that the communicating flag FT has already been set, it is kept as it is. Thereafter, the control unit 20 proceeds the processing to S34.

When the communication session number is determined to be different from that of the NC1 in S36 (NO in S36), the control unit 20 proceeds the processing to S38, transcribing the communication session number contained in this voice packet into the communication session number NC1 (S37). When the processing S36 is proceeded to the processing S37, the communication session is switched by the server 11 on the basis of the priority.

When the voice packet is not received in S30 (No in S30), the control unit 20 determines whether the communication session flag FC is set or not (S40). In case that the communication session flag FC is set (Yes in S40), the control unit 20 performs the processing in S41 and following steps. When the communication session flag FC is not set (No in S40), the control unit 20 finishes the processing without more steps.

In S41, the control unit 20 determines whether the communicating flag FT is set or not. When the communicating flag FT is set (Yes in S41), the control unit 20 finishes the processing without more steps. When the communicating flag FT is not set (No in S41), that is, in the state that the communication session flag FC is set though the communicating flag FT is reset, the control unit 20 subtracts 1 count (which corresponds to 20 milliseconds) from the holding timer T1 (S42), and determines whether the holding timer T1 becomes 0 or not by the subtraction (S43). When the holding timer T1 becomes 0 (Yes in S43), the control unit 20 resets the communication session flag to close the communication session (S44). In S43, when it is still greater than 0 in the holding timer T1 (No in S43), the control unit 20 finishes the processing without more steps.

Figure 8A:
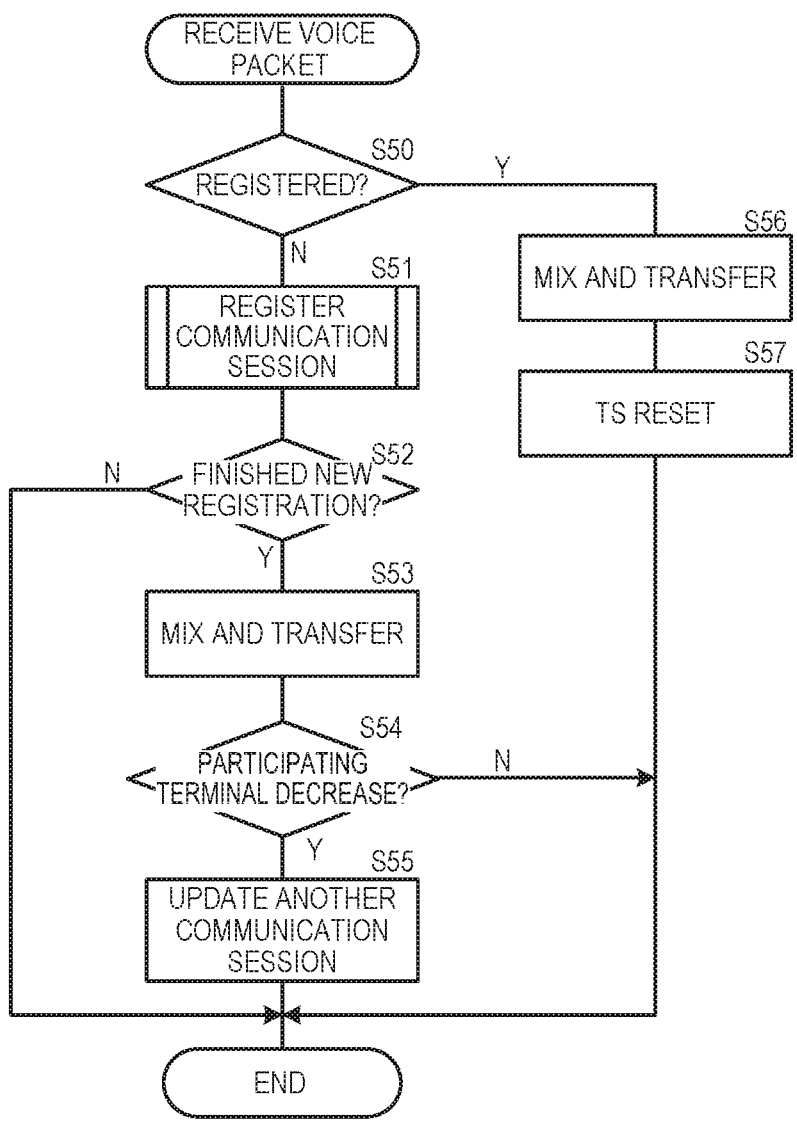
FIG. 8A is a process flowchart of the server.
Figure 8B:
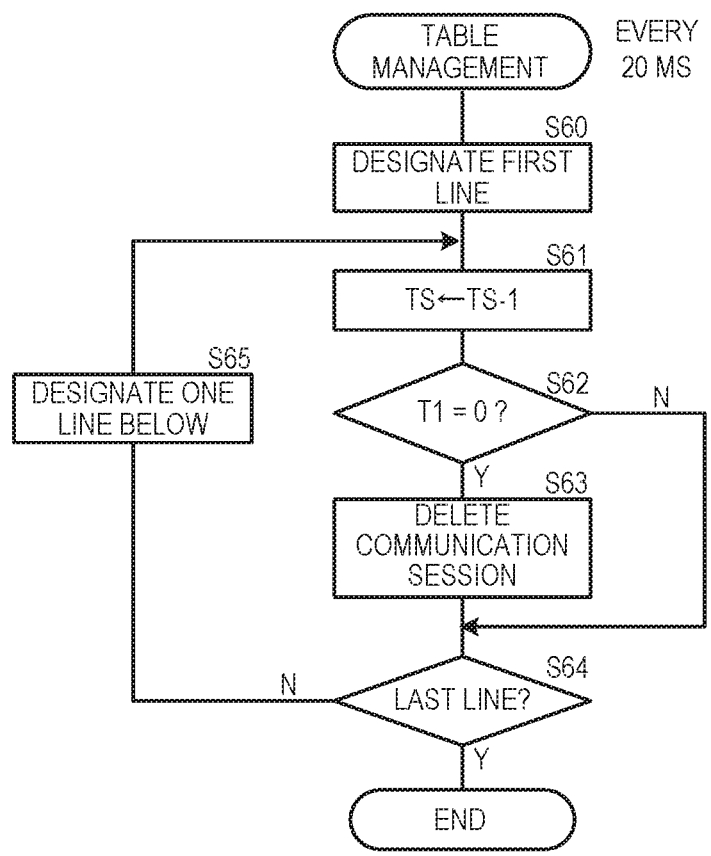
FIG. 8B is a process flowchart of the server.

The FIGS. 8A and 8B are process flowcharts of the server 11. The FIG. 8A shows the processing in receiving the voice packet. The FIG. 8B shows the managing processing of the mixing table.

In FIG. 8A, the control unit 30 determines if the communication session identified by the source terminal number and a communication partner number has already registered in the mixing table 303 (S50), when the voice packet is received. In case that the communication session has already registered in the mixing table 303 (YES in S50), the control unit 30 transfers the audio signal included in the received voice packet to the terminal device 14 which participates in the communication session on the basis of the participating terminal number of the mixing table 303 (S56), and resets the holding timer TS of the communication session in the mixing table 303 to 30 seconds (S57).

When the communication session of the received voice packet is not registered in the mixing table 303 (No in S50), that is, when the voice packet is the calling voice packet, a new communication session based on this calling voice packet is registered in the mixing table 303 (S51). The registering processing will be described below with FIG. 9.

Figure 9:
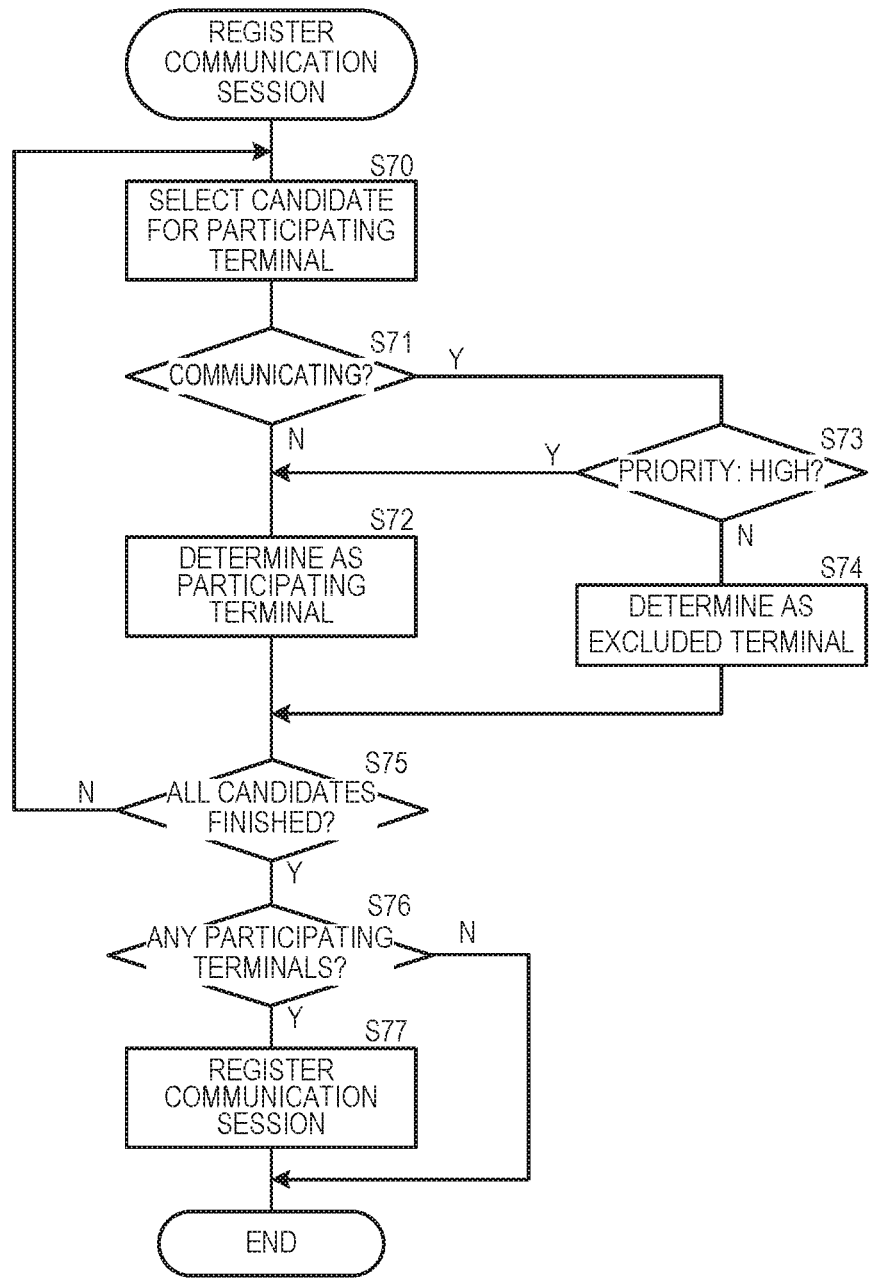
FIG. 9 is a process flowchart of registering processing by the server.

FIG. 9 is a process flowchart of registering processing by the server. The processing is proceeded in S51 of FIG. 8A. The control unit 30 selects one of the terminal device 14 (the number of the terminal device) which is the candidate of the participating terminal device 14 of a new communication session from the session numbers (the individual number/the group number/the plenary number) included in the received calling voice packet (S70). Then, the control unit 30 determines whether the terminal device 14 is being in the communication session or not (S71). Specifically, it is determined by whether the terminal device 14 is included the participating terminal devices 14 in the communication session registered in the mixing table 303. In case that it is not communicating in S71 (No in S71), the control unit 30 decides the terminal device 14 as the participating terminal device 14 of the new communication session (S72), and proceeds the processing to S75. On the other hand, in case that it is communicating in S71 (YES in S71), the control unit 30 determines whether the priority of the new communication session is higher than that of the existing communication session of the terminal device 14 or not (S73). If the priority of the new communication session is higher (YES in S73), the control unit 30 proceeds the processing to S72, and decides the terminal device 14 as the participating terminal device 14 of the new communication session. On the other hand, if the priority of the new communication session is lower (NO in S73), the control unit 30 decides the terminal device 14 as the excluded terminal device 14 of the new communication session, and proceeds the processing to S75. The control unit 30 proceeds the above processing repeatedly until the above processing of S70-S74 is proceeded to all the candidate terminal devices 14 of the new communication session (Yes in S75).

In case that the above processing to all the candidate terminal devices 14 is finished (YES in S75), the control unit 30 determines whether there is the terminal device 14 decided as the participating terminal device 14 or not (S76). If there are any terminal devices 14 of the participating terminal device 14 (YES in S76), the control unit 30 registers the new communication session to the mixing table 303 (S77), and finishes the processing. In S77, the communication partner number (the communication session number) of the calling voice packet is registered as the session number, and the terminal number of the terminal device 14 which is the calling source of the calling voice packet is registered as the calling terminal number. As the participating terminal number, the number of the terminal device 14 decided as the participating terminal and the calling terminal device number are registered. As the excluded terminal number, the number of the terminal device 14 decided as the excluded terminal number is registered. In this case, the number of the non-active terminal device 14 (active flag OFF) is also registered as the excluded terminal number. In case that there is no terminal device as the participating terminal (NO in s76), the control unit 30 does not register a new communication session to the mixing table 303 and finishes the registering processing because the new communication session cannot be established.

Then, the control unit 30 proceed the processing back to S52 in FIG. 8A. In S52, it is determined whether the new communication session is registered to the mixing table or not. If it is not registered to the mixing table (NO in S52), the control unit 30 finishes the processing in receiving the voice packet because the new communication session is not established. On the other hand, it is registered to the mixing table in S52 (YES in S52), the control unit 30 transfers the audio signal of the received voice packet to the terminal device 14 participating in the communication session on the basis of the participating terminal number of the mixing table 303.

The control unit 30 detects the terminal device 14 to be excluded from the participating terminal device of the communication session already registered in the mixing table 303 because of the communication session which is just established (S54). That is, in case that the terminal device 14 participating in the communication session established earlier is participates the new communication session which is just established on the basis of the priority or the like, it is necessary to be removed from the communication session established earlier. If there is any appropriate terminal device (YES in S54), the control unit 30 updates another communication session (S55). Specifically, the terminal number of the terminal device 14 is deleted from the field of the participating terminal number of the communication session established earlier. The excluded terminal number is transcribed into a column of the excluded terminal number. In case that all the terminal numbers of the terminal devices 14 are deleted from the field of the participating terminal number of the communication session established earlier, the communication session is deleted. Thus, the participating terminal device of the communication session is optimized. If there is nothing excluded from the participating terminal device of the communication session already registered in the mixing table 303 in S54 (NO in S54), the processing in receiving the voice packet is finished.

The management processing of the mixing table in FIG. 8B is performed periodically and repeatedly (for each 20 milliseconds, for example). The control unit 30 designates the communication session in the first line of the mixing table 303 (S60) at first, subtracts 1 count (for 20 milliseconds) from the holding timer TS of the designated communication session (S61), and determines whether the holding timer TS becomes 0 or not by the subtraction (S62). When the holding timer TS becomes 0 (Yes in S62), the control unit 30 deletes the communication session of the line as the communication session is finished (S63).

The control unit 30 manages the mixing table 303 by performing the processing above in order until the last line of the mixing table 303 (S64, S65).

In S63, after finishing the communication session, the terminal device 14 participating in the finished communication session may be made to participate in another existing communication session. For example, in case that the finished communication session is the communication session of the higher priority and there exists a terminal device 14 extracted from the earlier-established communication session of the lower priority in the participating terminal device of the finished communication session, the terminal device 14 may be participate in the earlier-established communication session of the lower priority again (of cause, only when the earlier-established communication session is still existing). In case that terminal device 14 participating in the higher priority communication session belongs to the communication session (the group) of the lower priority established later than the higher priority communication session, it may also be participated in the communication session of the lower priority from the middle. Executing above processing will be realized by procedures below, when finishing the communication session in S63, it is searched the excluded terminal number of another existing communication session in the participating terminal of the finished communication session, if the excluded terminal number is found, the terminal number is made to move to the participating terminal.

As explained above, in the audio communication system of the embodiment, the relaying device (the server 11) is connected to the terminal device 14 as the communication device, and manages the communication between the terminal devices 14 in the server 11 on the basis of the priority of the communication. By means of this, it becomes possible to switch immediately to the communication of the higher priority in the server 11 collectively. Thus, it is possible to shorten the time for switching the communication session as compared with a conventional one. Furthermore, as information about the priority of the communication is managed by the server 11, the user can apply the desired priority of the user only by updating information about the priority of the server 11 using the management device 12 and it is easy to update the priority. As the communication keeps as well as another communication after being switched to the higher priority, it is also possible to tell the communication partner what the user wants to tell definitely.

In the embodiment described above, the priority is provided to the kinds of the communication session which includes individual communication, the group communication, and the plenary communication, however, it is not limited to this. For example, the priority may be provided to the number of the terminal device 14, that is, a number of the terminal device 14 belonging to a certain section is applied the higher priority of than a number of the terminal device 14 belonging to another section. In case that the calling terminal number in a new communication session has the higher priority, the communication is switched to the new communication session even if in another communication session.

Moreover, the communication session is switched on the basis of the priority table in the embodiment, it is not limited to this. For example, the emergency call can be operated by the operation unit 22 of the terminal device 14, when the user operates the emergency call, the emergency communication session is applied the higher priority. Information showing the emergency is attached to the calling voice packet in which the emergency call is operated, and the server 11 determined the priority, receiving and storing the attached information.

In the embodiment above, the non-active terminal device is excluded from the communication session as the excluded terminal device, however, it may be made to participate in the communication session in the middle at the time the terminal device becomes active.

In the embodiment described above, when one of the participating terminals in the communication session leaves (moves to a new communication session) by the priority call, it is not notified other participating terminals (not leaving) in the communication session that one of the participating terminal devices leaves, however it may be notified. For example, it may be mixed and transmitted that the message voice informing that one of the terminal devices 14 leaves to the audio signal of the voice packet in the communication session. Furthermore, it may also be mixed and transmitted that the message voice informing that the communication session (the assignment) of one of the terminal devices 14 is changed to the audio signal of the voice packet in the communication session.

Furthermore, in the embodiment above, the communication session is switched immediately to the new higher-priority communication session from the existing communication session, however, it is not limited to this. For example, if the existing communication session is in the act of transmitting the voice packet, the communication session may be switched to the new one after finishing the transmission.

In the embodiment described above, the communication session is established in response to the calling voice packet transmitted from the terminal device 14, however, a trigger of establishment of the communication session is not limited to this. For example, the administrator may establish or close the session group by operating the mixing table 303 from the management device 12. Furthermore, the management device 12 may establish or close the extension group communication between groups described above. In this case, it may also be possible that the total management and flexible change of the communication session.

REFERENCE NUMERALS

11 server (Relaying device)
12 management device
13 wireless access point
14 terminal device
20 control unit (of terminal device)
30 control unit (of server)
32 network communication unit
220 Push-To-Talk (PTT) switch
301 terminal table
302 group table
303 mixing table
304 priority table

What is claimed is:

1. An audio communication system comprising:
   a relaying device and terminal devices communicating mutually via a communication network; wherein
   the relaying device comprises a control unit that
      establishes the communication session among the terminal devices through which the terminal devices communicate audio signals,
      stores a mixing table in which a session identification number and terminal device numbers are associated each other wherein the session identification number is to identify an existing communication session that is currently running and the device terminal numbers are to identify participating terminal devices that are currently participating in the existing communication session, and
      stores a priority table in which types and priority ranks of communication sessions are associated, wherein
   when an operator of one of the terminal devices transits an audio signal to establish a new communication session wherein the operator selects some of the terminal devices, which includes some of the participating terminal devices of the existing communication session, that are authorized to participate in the new communication session, and a type of the new communication session, and ID information identifying the authorized terminal devices and the type of the new communication session are transmitted to the relaying device together with the audio signal, the control unit
   determines priority ranks of the new communication session and the existing communication session referring to the mixing table and the priority table,
   compares the priority rank of the new communication session with the priority rank of the existing communication session,
   when the priority rank of the new communication session is equal to or lower than that of the existing communication session, the control unit establishes the new communication session,
determines the participating terminal devices of the existing communication session in the authorized terminal devices to participate in the new communication session by referring to the ID information and the mixing table, and
allows the authorized terminal devices excluding the participating terminal devices of the existing communication session to participate in the new communication session as participating terminal devices of the new communication session so that the audio signal is transmitted to the participating terminal devices of the new communication session,
when the priority of the new communication session is higher than that of the existing communication session, the control unit
establishes the new communication session,
allows the authorized terminal devices including the some of the participating terminal devices of the existing communication session to participate in the new communication session as participating terminal devices of the new communication session so that the audio signal is transmitted to the participating terminal devices of the new communication session,
determines the participating terminal devices of the new communication session in the participating terminal devices of the existing communication session by referring to the ID information and the mixing table, and
eliminates the participating terminal devices of the new communication session from the existing communication session so that the audio signal of the existing communication session is not transmitted to the participating terminal devices of the new communication session, and
each of the terminal devices comprises a terminal network communication unit communicating with the relaying device via the communication network and a terminal control unit transmitting the audio signal to which information designating the terminal device of the communication partner is attached to the relaying device using the terminal network communication unit.

2. The audio communication system according to claim 1, wherein
one of the terminal devices further comprises a push-to-talk circuit; and
the terminal network communication unit transmits the audio signal to the relaying device while the push-to-talk circuit is in ON status, and receives the audio signal transmitted from the relaying device regardless of that the push-to-talk circuit is in ON/OFF status.

3. The audio communication system according to claim 1, wherein
the network comprises a plurality of access points for a wireless local area network;
the terminal network communication unit of the terminal devices connects to the network via any one of the access points, and
at least one of the terminal devices belongs to one access point and another of the terminal devices belongs to a different access point from the one access point.

4. A relaying method for establishing a communication session via a communication network among terminal devices through a relaying device, the relaying device comprising: a control unit that establishes the communication session among the terminal devices through which the terminal devices communicate audio signals,
stores a mixing table in which a session identification number and terminal device numbers are associated each other wherein the session identification number is to identify an existing communication session that is currently running and the device terminal numbers are to identify participating terminal devices that are currently participating in the existing communication session, and
stores a priority table in which types and priority ranks of communication sessions are associated, wherein
when an operator of one of the terminal devices transits an audio signal to establish a new communication session wherein the operator selects some of the terminal devices, which includes some of the participating terminal devices of the existing communication session, that are authorized to participate in the new communication session, and a type of the new communication session, and ID) information identifying the authorized terminal devices and the type of the new communication session are transmitted to the relaying device together with the audio signal, the relaying method performed by the relaying device comprises:
determining priority ranks of the new communication session and the existing communication session referring to the mixing table and the priority table, and
comparing the priority rank of the new communication session with the priority rank of the existing communication session, and
when the priority rank of the new communication session is equal to or lower than that of the existing communication session, the relaying method comprising:
establishing the new communication session,
determining the participating terminal devices of the existing communication session in the authorized terminal devices to participate in the new communication session by referring to the ID information and the mixing table, and
allowing the authorized terminal devices excluding the participating terminal devices of the existing communication session to participate in the new communication session as participating terminal devices of the new communication session so that the audio signal is transmitted to the participating terminal devices of the new communication session,
when the priority of the new communication session is higher than that of the existing communication session, the relaying method comprising:
establishing the new communication session and
allowing the authorized terminal devices including the some of the participating terminal devices of the existing communication session to participate in the new communication session as participating terminal devices of the new communication session so that the audio signal is transmitted to the participating terminal devices of the new communication session,
determining the participating terminal devices of the new communication session in the participating terminal devices of the existing communication session by referring to the ID information and the mixing table, and
eliminating the participating terminal devices of the new communication session from the existing communication session so that the audio signal of the existing communication session is not transmitted to the participating terminal devices of the new communication session.

5. The relaying method according to claim 4, wherein the control unit of the relaying device establishes
   an individual communication session in which one terminal device and one partner terminal device participate,
   a group communication session in which the terminal device belonging to a prepared group participates, and
   a plenary communication session in which all communicable terminal devices participate; and
   the storage unit stores the priority information of each communication session.

6. The relaying method according to claim 4, the relaying method further comprising:
   closing the communication session when a predetermined time elapses without receiving the audio signal from any of the participating terminal devices.

7. The relaying method according claim 6, wherein
   when the new communication session is closed and the existing communication session is not closed yet, the relaying further comprises a step of making the terminal device removed from the existing communication session participate in the existing communication session again.

8. A relaying device wirelessly connecting to terminal devices via a communication network, comprising:
   a control unit that
      establishes the communication session among the terminal devices through which the terminal devices communicate audio signals,
      stores a mixing table in which a session identification number and terminal device numbers are associated each other wherein the session identification number is to identify an existing communication session that is currently running and the device terminal numbers are to identify participating terminal devices that are currently participating in the existing communication session, and
      stores a priority table in which types and priority ranks of communication sessions are associated, wherein
   when an operator of one of the terminal devices transits an audio signal to establish a new communication session wherein the operator selects some of the terminal devices, which includes some of the participating terminal devices of the existing communication session, that are authorized to participate in the new communication session, and a type of the new communication session, and ID information identifying the authorized terminal devices and the type of the new communication session are transmitted to the relaying device together with the audio signal, the control unit
   determines priority ranks of the new communication session and the existing communication session referring to the mixing table and the priority table,
   compares the priority rank of the new communication session with the priority rank of the existing communication session,
   when the priority rank of the new communication session is equal to or lower than that of the existing communication session, the control unit
      establishes the new communication session,
      determines the participating terminal devices of the existing communication session in the authorized terminal devices to participate in the new communication session by referring to the ID information and the mixing table, and
      allows the authorized terminal devices excluding the participating terminal devices of the existing communication session to participate in the new communication session as participating terminal devices of the new communication session so that the audio signal is transmitted to the participating terminal devices of the new communication session,
   when the priority of the new communication session is higher than that of the existing communication session, the control unit
      establishes the new communication session,
      allows the authorized terminal devices including the some of the participating terminal devices of the existing communication session to participate in the new communication session as participating terminal devices of the new communication session so that the audio signal is transmitted to the participating terminal devices of the new communication session,
      determines the participating terminal devices of the new communication session in the participating terminal devices of the existing communication session by referring to the ID information and the mixing table, and
      eliminates the participating terminal devices of the new communication session from the existing communication session so that the audio signal of the existing communication session is not transmitted to the participating terminal devices of the new communication session.

9. The relaying device of claim 8, wherein
   when the new communication session is established, the control unit allows some of the authorized terminal devices, which are not the participating terminal devices, to participate in the new communication session.

10. The relaying device according to claim 8, wherein the control unit establishes
    an individual communication session in which one terminal device and one partner terminal device participate,
    a group communication session in which the terminal device belonging to a prepared group participates, and
    a plenary communication session in which all communicable terminal devices participate; and
    the priority information storage unit stores the priority information of each communication session.

11. The relaying device according to claim 8, wherein the control unit closes the communication session when a predetermined time elapses without receiving the audio signal from any of the participating terminal devices.

12. The relaying device according claim 11, wherein
    when the new communication session is closed and the existing communication session is not closed yet, the control unit makes the terminal device removed from the existing communication session participate in the existing communication session again.

* * * * *